United States Patent
Lv et al.

(10) Patent No.: US 11,942,996 B2
(45) Date of Patent: Mar. 26, 2024

(54) OPTICAL SIGNAL OUTPUTTING DEVICE, METHOD, AND STORAGE MEDIUM

(71) Applicant: WUHAN TELECOMMUNICATION DEVICES CO., LTD., Wuhan (CN)

(72) Inventors: Nina Lv, Wuhan (CN); Qinlian Bu, Wuhan (CN)

( * ) Notice: Subject to any disclaimer, the term of this patent is extended or adjusted under 35 U.S.C. 154(b) by 0 days.

(21) Appl. No.: 17/631,031

(22) PCT Filed: Dec. 4, 2019

(86) PCT No.: PCT/CN2019/123118
§ 371 (c)(1),
(2) Date: Jan. 28, 2022

(87) PCT Pub. No.: WO2021/017355
PCT Pub. Date: Feb. 4, 2021

(65) Prior Publication Data
US 2022/0271840 A1  Aug. 25, 2022

(30) Foreign Application Priority Data
Jul. 29, 2019 (CN) .......... 201910690822.X

(51) Int. Cl.
*H04B 10/00* (2013.01)
*G02B 6/42* (2006.01)
*H04B 10/50* (2013.01)

(52) U.S. Cl.
CPC ......... *H04B 10/503* (2013.01); *G02B 6/4203* (2013.01)

(58) Field of Classification Search
CPC .. H04B 10/503; H04B 10/291; G02B 6/4203; H01S 3/094053
See application file for complete search history.

(56) References Cited

U.S. PATENT DOCUMENTS

| | | | | |
|---|---|---|---|---|
| 5,103,456 A | * | 4/1992 | Scifres | H01S 5/026 372/99 |
| 5,128,948 A | * | 7/1992 | Papuchon | H01S 3/109 372/75 |

(Continued)

FOREIGN PATENT DOCUMENTS

| | | |
|---|---|---|
| CN | 101291037 A | 10/2008 |
| CN | 106207721 A | 12/2016 |

(Continued)

OTHER PUBLICATIONS

International Search Report of PCT/CN2019/123118 filed Dec. 4, 2019.

(Continued)

*Primary Examiner* — Agustin Bello
(74) *Attorney, Agent, or Firm* — Chang & Hale LLP

(57) ABSTRACT

Disclosed are an optical signal outputting device and method, and a storage medium. The device includes a pump laser, first fiber grating and target fiber grating connected seriatim, the pump laser being configured to emit a first optical signal to the first fiber grating upon receiving a target waveband optical signal transmission instruction, and convert a second waveband optical signal into a target waveband optical signal by resonance upon receiving an optical signal adjusting instruction, then output the same; the first fiber grating being configured to filter the first optical signal to obtain a first waveband optical signal and send it to the target fiber grating; and the target fiber grating being configured to filter the first waveband optical signal to obtain a second waveband optical signal and the target waveband optical signal to use one of them to deliver the optical signal adjusting instruction to the pump laser.

18 Claims, 3 Drawing Sheets

(56) References Cited

U.S. PATENT DOCUMENTS

| | | | | |
|---|---|---|---|---|
| 5,185,752 A * | 2/1993 | Welch | G02F 1/3775 | 359/328 |
| 5,191,586 A * | 3/1993 | Huber | H04B 10/2912 | 372/19 |
| 5,237,576 A * | 8/1993 | DiGiovanni | G02B 6/02057 | 372/66 |
| 5,268,910 A * | 12/1993 | Huber | H04B 10/291 | 372/20 |
| 5,305,335 A * | 4/1994 | Ball | H01S 3/067 | 372/102 |
| 5,323,404 A * | 6/1994 | Grubb | H01S 3/0675 | 359/345 |
| 5,511,083 A * | 4/1996 | D'Amato | H01S 3/0675 | 372/27 |
| 5,530,710 A * | 6/1996 | Grubb | H01S 3/06754 | 385/127 |
| 5,561,675 A * | 10/1996 | Bayon | H01S 3/0675 | 372/27 |
| 5,564,832 A * | 10/1996 | Ball | G01J 3/1895 | 374/161 |
| 5,640,480 A * | 6/1997 | Komine | G02F 1/395 | 359/332 |
| 5,682,397 A * | 10/1997 | Scheps | H01S 3/094034 | 372/71 |
| 5,832,156 A * | 11/1998 | Strasser | G02B 6/29359 | 385/48 |
| 5,898,718 A * | 4/1999 | Mohatt | G02F 1/377 | 359/328 |
| 5,991,314 A * | 11/1999 | Ionov | H01S 3/0675 | 372/19 |
| 6,041,070 A * | 3/2000 | Koch | H01S 3/0941 | 372/102 |
| 6,108,469 A * | 8/2000 | Chen | G02B 6/12007 | 398/1 |
| 6,188,712 B1 * | 2/2001 | Jiang | H01S 3/0675 | 372/6 |
| 6,295,304 B1 * | 9/2001 | Koch | H01S 3/0675 | 372/102 |
| 6,304,366 B1 * | 10/2001 | Scalora | G02F 1/355 | 359/328 |
| 6,310,899 B1 * | 10/2001 | Jacobovitz-Veselka | H04B 10/2916 | 372/99 |
| 6,337,939 B1 * | 1/2002 | Aspell | H01S 5/0687 | 372/6 |
| 6,400,736 B1 * | 6/2002 | Aherne | H01S 5/146 | 372/102 |
| 6,459,715 B1 * | 10/2002 | Khalfin | H01S 5/026 | 372/50.1 |
| 6,510,167 B1 * | 1/2003 | Jain | H01S 3/0675 | 372/18 |
| 6,591,023 B1 * | 7/2003 | Schunk | H04B 10/503 | 385/129 |
| 6,711,183 B1 * | 3/2004 | Mizuuchi | G02F 1/3775 | 372/50.1 |
| 6,788,727 B2 * | 9/2004 | Liu | H01S 5/3402 | 372/102 |
| 6,810,178 B2 * | 10/2004 | Davis | G02B 6/022 | 385/37 |
| 6,996,140 B2 * | 2/2006 | Waarts | G02F 1/377 | 372/21 |
| 7,106,762 B1 * | 9/2006 | Jiang | H01S 3/0675 | 372/102 |
| 7,113,524 B2 * | 9/2006 | Bonaccini | H01S 3/302 | 372/6 |
| 7,136,401 B2 * | 11/2006 | Leplingard | H01S 3/302 | 372/6 |
| 7,167,490 B2 * | 1/2007 | Mehuys | H01S 3/06754 | 372/102 |
| 7,590,155 B2 * | 9/2009 | Liu | H01S 3/0941 | 372/18 |
| 7,734,132 B2 * | 6/2010 | Atkins | H01S 5/146 | 372/6 |
| 7,796,672 B2 * | 9/2010 | Komatsu | H04N 9/3129 | 372/19 |
| 7,949,215 B2 * | 5/2011 | Nicholson | H01S 3/06708 | 372/6 |
| 8,228,960 B2 * | 7/2012 | Furukawa | H01S 5/4062 | 372/21 |
| 8,390,920 B2 * | 3/2013 | Kimura | G02B 27/145 | 359/328 |
| 8,699,124 B2 * | 4/2014 | Dunn | G02F 1/39 | 359/326 |
| 8,861,074 B2 * | 10/2014 | Rae | G02F 1/3544 | 359/330 |
| 9,040,918 B2 * | 5/2015 | Nawata | G02F 1/3558 | 250/339.06 |
| 9,190,799 B2 * | 11/2015 | Luo | H01S 3/11 | |
| 9,429,813 B2 * | 8/2016 | Kaneda | H01S 3/1616 | |
| 10,063,034 B2 * | 8/2018 | Kondo | H01S 5/2202 | |
| 10,651,622 B2 * | 5/2020 | Hovhannisyan | H01S 3/1022 | |
| 10,725,359 B2 * | 7/2020 | Nawata | G02F 1/37 | |
| 11,002,980 B1 * | 5/2021 | Ling | G02B 27/1086 | |
| 2001/0010696 A1 * | 8/2001 | Bufetov | H01S 3/302 | 372/6 |
| 2001/0028029 A1 * | 10/2001 | Scalora | B82Y 20/00 | 250/216 |
| 2002/0071470 A1 * | 6/2002 | Goto | H01S 5/141 | 372/92 |
| 2003/0002794 A1 * | 1/2003 | Ramachandran | G02B 6/255 | 385/27 |
| 2003/0156808 A1 * | 8/2003 | Sudo | G02B 6/03694 | 385/37 |
| 2004/0056183 A1 * | 3/2004 | Eggleton | G02B 6/124 | 250/227.23 |
| 2004/0105615 A1 * | 6/2004 | Okuno | H01S 3/302 | 385/16 |
| 2004/0207913 A1 * | 10/2004 | Mehuys | H01S 3/06754 | 359/341.3 |
| 2004/0213301 A1 * | 10/2004 | Sharma | H01S 3/0675 | 372/6 |
| 2007/0047066 A1 * | 3/2007 | Green | H01S 3/302 | 359/326 |
| 2008/0013878 A1 * | 1/2008 | Fujiwara | G02B 6/1226 | 385/27 |
| 2009/0279573 A1 * | 11/2009 | Mizuuchi | H01S 3/0675 | 372/6 |
| 2010/0002733 A1 * | 1/2010 | Luo | H01S 3/0675 | 372/14 |
| 2010/0066649 A1 * | 3/2010 | Furuya | H04N 9/3161 | 345/55 |
| 2010/0183037 A1 * | 7/2010 | Furuya | G02B 6/0008 | 372/6 |
| 2010/0220384 A1 * | 9/2010 | Kimura | G02B 27/48 | 359/328 |
| 2010/0284428 A1 * | 11/2010 | Furuya | H01S 3/0675 | 372/6 |
| 2010/0290105 A1 * | 11/2010 | Furuya | H04N 9/3161 | 353/31 |
| 2011/0075688 A1 * | 3/2011 | Chiang | G02F 1/292 | 372/12 |
| 2013/0188243 A1 * | 7/2013 | Nicholson | H01S 3/0826 | 359/334 |
| 2013/0293895 A1 * | 11/2013 | Oto | G01N 21/59 | 359/328 |
| 2014/0112357 A1 * | 4/2014 | Abedin | H01S 3/0675 | 372/3 |
| 2014/0133515 A1 * | 5/2014 | Hersman | H01S 5/4062 | 372/75 |
| 2014/0299773 A1 * | 10/2014 | Nawata | G01J 1/42 | 250/353 |
| 2016/0223710 A1 * | 8/2016 | Barry | G01D 5/35316 | |
| 2018/0219351 A1 * | 8/2018 | Munroe | H01S 3/0405 | |
| 2020/0166822 A1 * | 5/2020 | Nawata | G02F 1/39 | |
| 2020/0358243 A1 * | 11/2020 | Kusaka | H01S 3/302 | |
| 2021/0050702 A1 * | 2/2021 | Wang | H01S 3/0675 | |

(56) References Cited

U.S. PATENT DOCUMENTS

| | | | |
|---|---|---|---|
| 2022/0146765 A1* | 5/2022 | Shima | H01S 3/0804 |
| 2022/0255293 A1* | 8/2022 | Kano | H01S 5/0234 |
| 2022/0271840 A1* | 8/2022 | Lv | H04B 10/503 |

FOREIGN PATENT DOCUMENTS

| | | | |
|---|---|---|---|
| CN | 106356705 A | 1/2017 | |
| CN | 109286122 A | 1/2019 | |
| CN | 110380326 A | 10/2019 | |
| IN | 1437036 A | 8/2003 | |
| WO | 2012101391 A1 | 8/2012 | |

OTHER PUBLICATIONS

Written Opinion of the International Searching Authority of PCT/CN2019/123118 filed Dec. 4, 2019.
Search Report of Chinese Priority Application CN201910690822.X filed Jul. 29, 2019.

\* cited by examiner

OPTICAL SIGNAL OUTPUTTING DEVICE, METHOD, AND STORAGE MEDIUM

CROSS-REFERENCE

The present disclosure claims the benefit of, and priority to Chinese Patent Application No. 201910690822.x filed on Jul. 29, 2019 and entitled "optical signal outputting device, method, and storage medium", the disclosure of which is hereby expressly incorporated by reference herein in its entirety.

TECHNICAL FIELD OF THE DISCLOSURE

The present disclosure relates to the technical area of optical fiber communication, more specifically, to an optical signal outputting device, an optical signal outputting method, and a storage medium.

BACKGROUND

In recent years, in the optical fiber communication systems, the Erbium-doped Optical Fiber Amplifiers (EDFA) are a key member for long distance communication and can perform power amplification in C-band 1550 nm, S-band 1480 nm and L-band 1610 nm, which are widely used in fields such as long distance optical fiber communication, high speed communication and optical fiber access cable television (Community Antenna Television, CATV). With the development of optical fiber communication technology, requirements of power-in-band for the pump lasers as the core element of EDFA become higher and higher.

The existing optical fiber communication technology filters optical signals generated by the pump laser by using the first optical fiber grating. As shown in FIG. 1, the low filtering precision of the first optical fiber grating disables it from filtering light having a wavelength close to the target central wavelength when optical signals of the target central wavelength generated by the pump laser pass through the first optical fiber grating, which allows the outputted optical signals to contain many optical signals having non-target central wavelengths, disables optical signals of non-target central wavelengths to be used by EDFA and lowers the quality of light of non-target central wavelengths outputted by the pump laser.

SUMMARY

Embodiments of the present disclosure provide an optical signal outputting device, an optical signal outputting method, and a storage medium therefor, which can improve the quality of light of the target central wavelength of the pump laser's output spectrum.

The present disclosure provides an optical signal outputting device comprising:

a target optical fiber grating having a preset angle optical fiber grating and/or a preset period optical fiber grating;

a first optical fiber grating connected to the target optical fiber grating; and a pump laser connected to the first optical fiber grating;

wherein the pump laser is configured to emit a first optical signal to the first optical fiber grating when a target band optical signal emitting command is received, a central wavelength of the first optical signal being a target wavelength of the target band optical signal; and to convert a second band optical signal into the target band optical signal by using resonance and output the target band optical signal when an optical signal adjusting command is received;

wherein the first optical fiber grating is configured to screen a first band optical signal from the first optical signal and transmit the first band optical signal to the target optical fiber grating, a central wavelength of the first band optical signal being the target wavelength of the target band optical signal and a band scope of the first band optical signal being smaller than a band scope of the first optical signal; and wherein the target optical fiber grating is configured to screen the second band optical signal and the target band optical signal from the first band optical signal to transmit the optical signal adjusting command to the pump laser by using the second band optical signal or the target band optical signal.

In the above optical signal outputting device, the preset angle optical fiber grating is an optical fiber grating whose preset angle is an intersection angle between the grating plane and the optical fiber shaft, and the preset period optical fiber grating is an optical fiber grating whose period length meets a preset period length.

In the above optical signal outputting device, the preset angle optical fiber grating is further configured to identify a first preset band optical signal from the second band optical signal; to process the first preset band optical signal by means of the present angle to obtain the target band optical signal; and to return the target band optical signal back to the pump laser so as to trigger the pump laser to generate resonance; and the first preset band optical signal is a part of the second band optical signal.

In the above optical signal outputting device, the preset period optical fiber grating is further configured to identify a second preset band optical signal from the target band optical signal; and to return the second preset band optical signal back to the pump laser so as to trigger the pump laser to generate resonance; and the second preset band optical signal is a part of the target band optical signal.

In the above optical signal outputting device, the preset angle optical fiber grating is further configured to, when an output end of the preset angle optical fiber grating receives a second optical signal, screen out a third optical signal that does not belong to a preset band scope corresponding to the preset angle optical fiber grating from the second optical signal and transmit the third optical signal to an output end of the first optical fiber grating; and the first optical fiber grating is further configured to screen out a target optical signal that belongs to a preset band scope corresponding to the first optical fiber grating from the third optical signal.

In the above optical signal outputting device, the preset angle optical fiber grating comprises at least one of a first preset angle optical fiber grating and a second preset angle optical fiber grating;

a central wavelength of the first preset angle optical fiber grating is smaller than the target central wavelength; and a central wavelength of the second preset angle optical fiber grating is larger than the target central wavelength.

In the above optical signal outputting device, the preset period optical fiber grating is an optical fiber grating featured by unidirectional optical signal transmission.

An embodiment of the present disclosure provides an optical signal outputting method applied to an optical signal outputting device which comprises a target optical fiber grating, the method comprising:

emitting a first optical signal whose central wavelength is a target wavelength of a target band optical signal when a target band optical signal emitting command is received;

screening a second band optical signal and the target band optical signal from the first optical signal by using the target optical fiber grating; and triggering a resonance operation by using the second band optical signal or the target band optical signal to convert the second band optical signal into the target band optical signal by using the resonance operation, and outputting the target band optical signal.

In the above method, the step of screening the second band optical signal and the target band optical signal from the first optical signal by using the target optical fiber grating comprises:

screening, from the first optical signal, a first band optical signal whose central wavelength is the target wavelength of the target band optical signal and whose band scope is smaller than a band scope of the first optical signal; and screening the second band optical signal and the target band optical signal from the first band optical signal by using the target optical fiber grating.

In the above method, the target optical fiber grating comprises a preset angle optical fiber grating provided with a preset angle, and the step of triggering the resonance operation by using the second band optical signal or the target band optical signal comprises:

identifying a first preset band optical signal from the second band optical signal by using the preset angle optical fiber grating; processing the first preset band optical signal by means of the preset angle and obtaining the target band optical signal; and triggering the resonance operation by using the target band optical signal to convert the second band optical signal into the target band optical signal by means of the resonance operation; the first preset band optical signal being a part of the second band optical signal.

In the above method, the target optical fiber grating comprises a preset period optical fiber grating, and the step of triggering the resonance operation by using the second band optical signal or the target band optical signal comprises:

identifying a second preset band optical signal from the target band optical signal by using the preset period optical fiber grating;

triggering a resonance operation by using the second preset band optical signal to convert the second band optical signal into the target band optical signal by using the resonance operation; the second preset band optical signal being a part of the target band optical signal.

In the above method, the optical signal outputting device further comprises a first optical fiber grating, and after triggering the resonance operation by using the target band optical signal, the method further comprises:

screening out a third optical signal that does not belong to a preset band scope corresponding to the preset angle optical fiber grating from a second optical signal and transmitting the third optical signal to an output end of the first optical fiber grating when an output end of the preset angle optical fiber grating receives the second optical signal; and screening out a target optical signal that belongs to a preset band scope corresponding to the first optical fiber grating from the third optical signal.

An embodiment of the present disclosure provides a storage medium, upon which is stored with a computer program applied to an optical signal outputting device, wherein the computer program is executed by a processor to realize any one of the above methods.

The embodiments of the present application provide an optical signal outputting device, an optical signal outputting method, and a storage medium therefor. The device comprises a target optical fiber grating having a preset angle optical fiber grating and/or a preset period optical fiber grating; a first optical fiber grating connected to the target optical fiber grating, and a pump laser connected to the first optical fiber grating, wherein the pump laser is configured to transmit a first optical signal to the first optical fiber grating when a target band optical signal emitting command is received, a central wavelength of the first optical signal being the target wavelength of the target band optical signal; and to convert a second band optical signal into the target band optical signal by using resonance and output the target band optical signal when an optical signal adjusting command is received; wherein the first optical fiber grating is configured to screen a first band optical signal from the first optical signal and transmit the first band optical signal to the target optical fiber grating, a central wavelength of the first band optical signal being the target wavelength of the target band optical signal and a band scope of the first band optical signal being smaller than a band scope of the first optical signal; and wherein the target optical fiber grating is configured to screen the second band optical signal and the target band optical signal from the first band optical signal to transmit the optical signal adjusting command to the pump laser by using the second band optical signal or the target band optical signal. By providing the preset angle optical fiber grating or the preset period optical fiber grating behind the first optical fiber grating, implementations achieved by the above optical signal outputting device allow the preset angle optical fiber grating or the preset period optical fiber grating to screen out the target band optical signals while converting the second band optical signal into the target band optical signal by means of the resonance operation of the pump laser, which obtains the high quality target band optical signal and improves the quality of light of the target central wavelength outputted by the pump laser.

Below, the technical solutions of the present application will be further described in detail by drawings and embodiments.

DETAILED DESCRIPTION

Technical solutions in embodiments of the present disclosure will be clearly and completely described in conjunction with drawings in embodiments of the present disclosure.

Embodiment I

Figure 1:
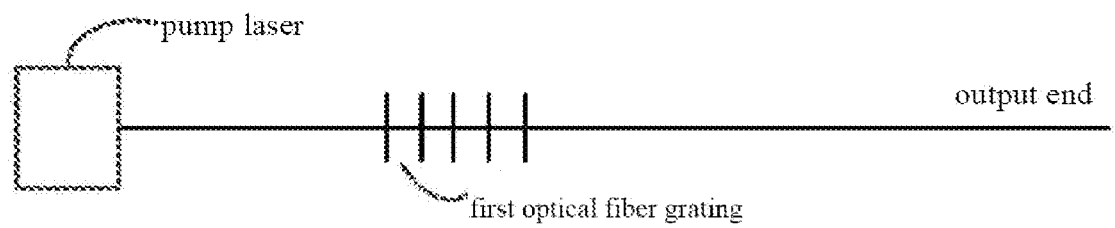
FIG. 1 is a connection schematic diagram I of an exemplary optical signal outputting device provided by an embodiment of the present disclosure.
Figure 2:
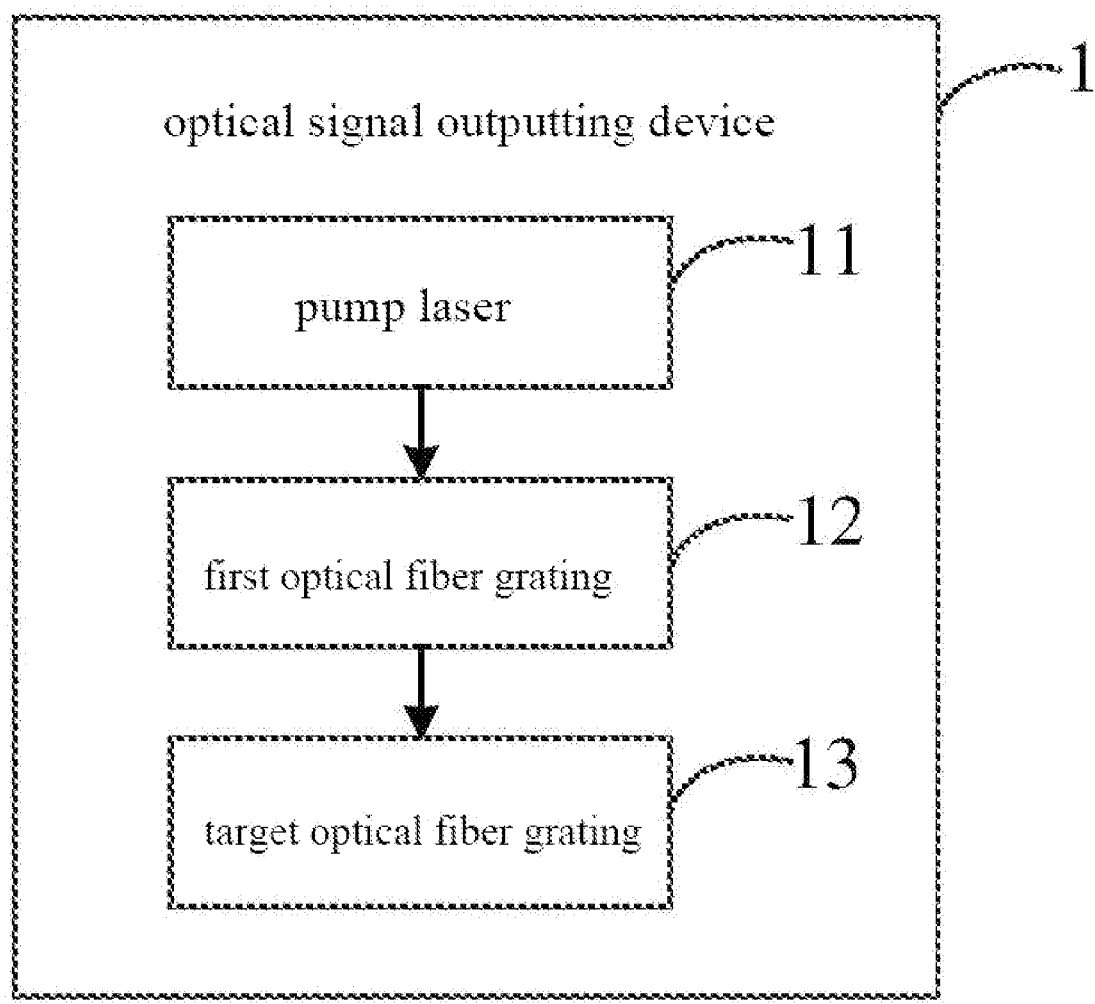
FIG. 2 is a structure schematic diagram II of an optical signal outputting device provided by an embodiment of the present disclosure.

An embodiment of the present disclosure provides an optical signal outputting device 1. As shown in FIG. 2, the optical signal outputting device 1 comprises:

a target optical fiber grating 13 having a preset angle optical fiber grating and/or a preset period optical fiber grating;

a first optical fiber grating 12 connected to the target optical fiber grating; and a pump laser 11 connected to the first optical fiber grating;

wherein the pump laser is configured to transmit a first optical signal to the first optical fiber grating when a target band optical signal emitting command is received, wherein a central wavelength of the first optical signal is a target wavelength of a target band optical signal; and to convert a second band optical signal into the target band optical signal by using resonance and output the target band optical signal when an optical signal adjusting command is received;

the first optical fiber grating is configured to screen a first band optical signal from the first optical signal and transmit the first band optical signal to the target optical fiber grating, wherein a central wavelength of the first band optical signal is a target wavelength of the target band optical signal and a band scope of the first band optical signal is smaller than a band scope of the first optical signal; and the target optical fiber grating is configured to screen the second band optical signal and the target band optical signal from the first band optical signal to transmit the optical signal adjusting command to the pump laser by using the second band optical signal or the target band optical signal.

The optical signal outputting device provided by the embodiment of the present application is suitable for the scenario of obtaining the target band optical signal by converting non-target band optical signals generated by the pump laser.

In an embodiment of the present application, the optical signal outputting device comprises a target optical fiber grating, a first optical fiber grating connected to the target optical fiber grating, and a pump laser connected to the first optical fiber grating, wherein the target optical fiber grating comprises a preset angle optical fiber grating and a preset period optical fiber grating, the intersection angle between a grating plane of the preset angle optical fiber grating and an optical fiber shaft is a preset angle, and a period length of the preset period length optical fiber grating meets a preset period length.

Exemplarily, the preset period length optical fiber grating can be an optical fiber grating having a period length greater than 1 um, such as a long period optical fiber grating. The specific preset period length can be identified according to the actual situations, which will not be limited by the present application.

In an embodiment of the present application, the pump laser is provided with a target central wavelength. When the pump laser is activated, the pump laser receives the target band optical signal emitting command and begins to generate optical signals of the target central wavelength while generating optical signals of non-target central wavelengths. The pump laser transmits all the optical signals generated by the pump laser to the first optical fiber grating, that is, the pump laser transmits the first optical signal to the first optical fiber grating.

It should be noted that the first optical signal is an optical signal generated by the pump laser.

Exemplarily, the target central wavelength of the pump laser is 974 nm. When the pump laser is activated, the pump laser receives the target band optical signal emitting command and generates an optical signal with a wavelength of 974 nm while generating part of optical signals in a band scope of 960-973 nm and part of optical signals in a band scope of 975-980 nm. That is, the first optical signal is an optical signal having a wavelength in the band scope of 960-980 nm, and the pump laser emits the optical signal in the band scope of 960-980 nm.

In an embodiment of the present application, a resonant cavity is provided in the pump laser. When the pump laser receives the optical signal adjusting command, the resonant cavity of the pump laser begins to resonate. As the optical signal adjusting command is an optical signal in the target band and received by the pump laser, the pump laser can convert the second band optical signal into the target band optical signal with the resonance, as such, the optical signal outputting device obtains the target band optical signal and outputs the target band optical signal.

It should be noted that the target optical signal can be an optical signal in the target band and outputted by the optical signal outputting device. For example, if the target band configured for the optical signal outputting device is 974-975 nm, then the optical signal having a wavelength of 974-975 nm and outputted by the optical signal outputting device are the target band optical signal.

It should be noted that the second band optical signal is an optical signal, other than the target band optical signal, screened out by the target optical fiber grating from the first band optical signal.

Exemplarily, the wavelength scope of the target band optical signal is 974-975 nm and the wavelength scope of the second band optical signal is 976-978 nm. When the pump laser receives the adjusting command for optical signals in a wavelength scope of 974-975 nm, the pump laser generates a resonance to convert optical signals in the wavelength scope of 976-978 nm into optical signals in the wavelength scope of 974-975 nm, and at the same time, the optical signal outputting device obtains the target band optical signal in the wavelength scope of 974-975 nm and outputs the target band optical signal.

In an embodiment of the present application, the first optical fiber grating is specified with a grating reflectivity. When the first optical fiber grating receives the first optical signal emitted by the pump laser, the first optical fiber grating screens the first band optical signal from the first optical signal and returns the optical signal consistent with the grating reflectivity in the first band optical signal back to the pump laser so as to trigger the resonant cavity of the pump laser to generate resonance, whereby converting the optical signal other than the first band optical signal in the first optical signal into the first band optical signal. As the central wavelength of the first band optical signal is the same as the target wavelength of the target band optical signal, the first band optical signal is screened out and transmitted to the target optical fiber grating.

It should be noted that the first band optical signal is the optical signal screened out from the first optical signal by the first optical fiber grating, the central wavelength of the first band optical signal is the target wavelength of the target band optical signal and the band scope of the first band optical signal is smaller than the band scope of the first optical signal.

In an embodiment of the present application, the first optical fiber grating may be an ordinary one and it can be specifically identified according to the actual situations, which will not be limited by embodiments of the present application.

In an embodiment of the present application, the target optical fiber grating comprises a preset angle optical fiber grating and a preset period optical fiber grating. When the target optical fiber grating is specifically a preset angle optical fiber grating and the preset angle optical fiber grating receives the first band optical signal, the preset angle optical fiber grating screens out the second band optical signal and the target band optical signal from the first band optical signal and transmits the optical signal adjusting command to the pump laser by means of the second band optical signal; when the target optical fiber grating is specifically the preset period optical fiber grating and the preset period optical fiber grating receives the first band optical signal, the preset period optical fiber grating screens out the second band optical signal and the target band optical signal from the first band optical signal and transmits the optical signal adjusting command to the pump laser by means of the target band optical signal.

Figure 3:
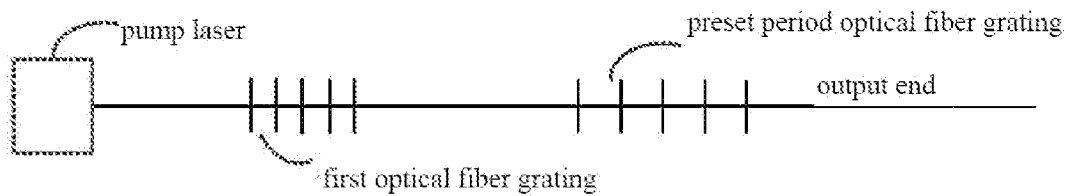
FIG. 3 is a connection schematic diagram III of an exemplary optical signal outputting device provided by an embodiment of the present disclosure.

In an embodiment of the present application, when the target optical fiber grating is a preset period optical fiber grating, the connection manner between the pump laser, the first optical fiber grating and the preset period optical fiber grating is shown in FIG. 3. An output end of the pump laser is connected to an input end of the first optical fiber grating, and an output end of the first optical fiber grating is connected to an input end of the preset period optical fiber grating. The target central wavelength of the pump laser can be 974 nm, and the central wavelength scope of the first optical fiber grating and that of the preset period optical fiber grating can be 974-975 nm. When the pump laser receives the target band optical signal emitting command, the pump laser generates the first optical signal including the optical signal with a wavelength of 974 nm and the optical signal with a wavelength other than 974 nm, and transmits the same to the first optical fiber grating. The first optical fiber grating screens out optical signals in the wavelength scope of 974-975 nm from the first optical signal, and screens out an optical signal consistent with the grating reflectivity from the optical signals which are in the wavelength scope of 974-975 nm, and then returned the optical signal consistent with the grating reflectivity back to the pump laser so as to trigger the pump laser to generate resonance, converting the optical signal in a wavelength scope other than 974-975 nm in the first optical signal into an optical signal in the wavelength scope of 974-975 nm. The low filtering precision of the first optical fiber grating fails to convert all the optical signals in the wavelength scope other than 974-975 nm in the first optical signal, which means the first band optical signal outputted by the first optical fiber grating includes the target band optical signal in the wavelength scope of 974-975 nm and the second band optical signal in a wavelength scope of 976-978 nm. When receiving the first band optical signal, the preset period optical fiber grating returns the optical signal consistent with the preset period reflectivity in the target band optical signal back to the pump laser so as to trigger resonance of the pump laser, then converts the second band optical signal into the target band optical signal and outputs the obtained target band optical signal.

Optionally, the preset angle optical fiber grating is an optical fiber grating whose preset angle is an intersection angle between a grating plane and an optical fiber shaft; the preset period optical fiber grating is an optical fiber grating whose period length meets a preset period length.

In an embodiment of the present application, the preset angle optical fiber grating can be an inclined optical fiber grating and the preset period optical fiber grating can be a long period optical fiber grating, whose specific examples can be identified according to the actual situation and will not be limited by embodiments of the present application.

Optionally, the preset angle optical fiber grating is further configured to identify a first preset band optical signal from the second band optical signal; to process the first preset band optical signal by means of the preset angle to obtain the target band optical signal; and to return the target band optical signal back to the pump laser so as to trigger the resonance of the pump laser; and the first preset band optical signal is a part of the second band optical signal.

In an embodiment of the present application, the preset angle optical fiber grating is specified with a preset reflectivity and a preset angle. When the preset angle optical fiber grating screens out the second band optical signal and the target band optical signal from the first band optical signal, it outputs the target band optical signal, identifies the first preset band optical signal from the second band optical signal according to the preset reflectivity, converts the first preset band optical signal into the target band optical signal by means of the preset angle and returns the target band optical signal back to the pump laser so as to trigger the generation of resonance by the pump laser.

It should be noted that the first preset band optical signal is a part of the second band optical signals.

Optionally, the preset period optical fiber grating is further configured to identify the second preset band optical signal from the target band optical signal; and to return the second preset band optical signal back to the pump laser so as to trigger the generation of resonance by the pump laser; and the second preset band optical signal is a part of the target band optical signal.

In an embodiment of the present application, the preset period optical fiber grating is specified with a preset period reflectivity. When the preset period optical fiber grating screens out the second band optical signal and the target band optical signal from the first band optical signal, it screens out the second preset band optical signal from the target optical signal according to the preset period reflectivity, outputs an optical signal in the target optical signal which is other than that in the second preset band from the target band optical signal, and returns the second preset band optical signal back to the pump laser so as to trigger the generation of resonance by the pump laser.

It should be noted that the second preset band optical signal is a part of the target band optical signal.

Optionally, the preset angle optical fiber grating is further configured to screen out a third optical signal that does not belong to a preset band scope corresponding to the preset angle optical fiber grating from a second optical signal and transmits the third optical signal to the output end of the first optical fiber grating when an output end of the preset angle optical fiber grating receives the second optical signal; and the first optical fiber grating is further configured to screen out the target optical signal that belongs to a preset band scope corresponding to the first optical fiber grating from the third optical signal.

In an embodiment of the present application, the second optical signal is an optical signal received by the output end of the preset angle optical fiber grating; the third optical signal is an optical signal in the second optical signal and other than ones that belong to the preset band scope corresponding to the preset angle optical fiber grating.

In an embodiment of the present application, when the output end of the first optical fiber grating receives the third optical signal, the target optical signal that belongs to the preset band scope corresponding to the first optical fiber grating is screened out from the third optical signal and is reversely transmitted to the pump laser.

Optionally, the preset angle optical fiber grating comprises at least one of a first preset angle optical fiber grating and a second preset angle optical fiber grating;

a central wavelength of the first preset angle optical fiber grating is smaller than the target central wavelength; and a central wavelength of the second preset angle optical fiber grating is larger than the target central wavelength.

Figure 4:
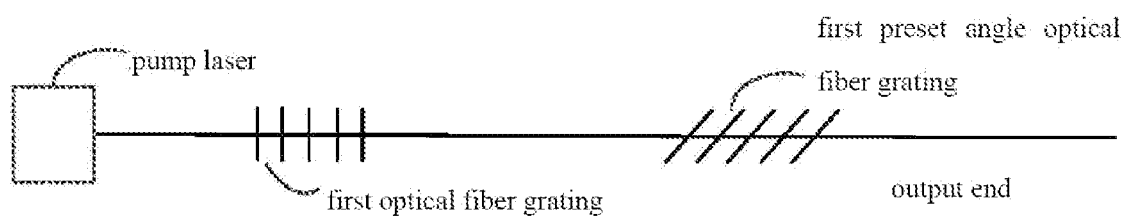
FIG. 4 is a connection schematic diagram IV of an exemplary optical signal outputting device provided by an embodiment of the present disclosure.

When the target optical fiber grating comprises a first preset angle optical fiber grating, the connection manner between the pump laser, the first optical fiber grating and the first preset angle optical fiber grating is shown in FIG. 4. The output end of the pump laser is connected to the input end of the first optical fiber grating and the output end of the first optical fiber grating is connected to the input end of the first preset angle optical fiber grating. The target central wavelength of the pump laser can be 974 nm, and the central wavelength scope of the first optical fiber grating and that of the preset period optical fiber grating can be in 974-975 nm. When the pump laser receives the target band optical signal emitting command, the pump laser generates the first optical signal including an optical signal with a wavelength of 974 nm and an optical signal with a wavelength other than 974 nm. The pump laser transmits the first optical signal to the first optical fiber grating. The first optical fiber grating screens out the optical signal in the wavelength scope of 974-975 nm from the first optical signal, screens out the optical signal that meets the grating reflectivity from the optical signal in the wavelength scope of 974-975 nm and returns the screened optical signal back that meets the grating reflectivity to the pump laser so as to trigger the generation of resonance by the pump laser, thereby converting the optical signal in a wavelength scope other than 974-975 nm in the first optical signal into the optical signal in the wavelength scope of 974-975 nm. The low filtering precision of the first optical fiber grating fails to convert all optical signals in a wavelength scope other than 974-975 nm in the first optical signal, which means the first band optical signal outputted by the first optical fiber grating includes the target band optical signal in the wavelength scope of 974-975 nm and the second band optical signal in a wavelength scope of 976-978 nm. When the first preset angle optical fiber grating receives the first band optical signal, it outputs the target band optical signal, converts the optical signal that meets the preset reflectivity in the second band optical signal into the target band optical signal by means of the preset angle, and returns the target band optical signal back to the pump laser, thereby triggering the generation of resonance by the pump laser, converting the second band optical signal into the target band optical signal and outputting the obtained target band optical signal.

Figure 5:
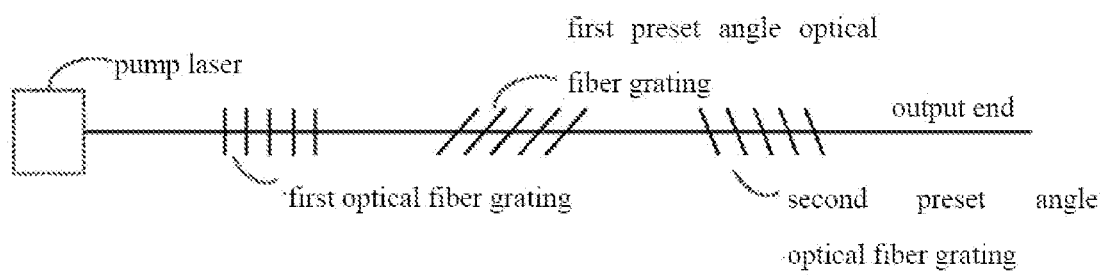
FIG. 5 is a connection schematic diagram V of an exemplary optical signal outputting device provided by an embodiment of the present disclosure.

In an embodiment of the present application, when the target optical fiber grating comprises a first preset angle optical fiber grating and a second preset angle optical fiber grating, the connection method of the optical signal outputting device is shown in FIG. 5. The output end of the pump laser is connected to the input end of the first optical fiber grating, the output end of the first optical fiber grating is connected to the input end of the first preset angle optical fiber grating and the input end of the first preset angle optical fiber grating is connected to the output end of the second preset angle optical fiber grating.

Figure 6:
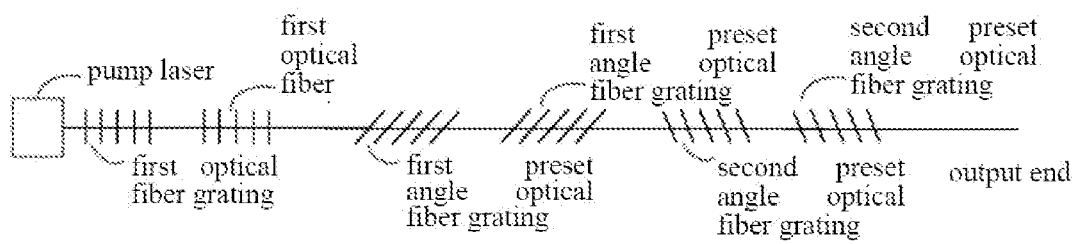
FIG. 6 is a connection schematic diagram VI of an exemplary optical signal outputting device provided by an embodiment of the present disclosure.

It should be noted that the target optical fiber grating can be a collection of a plurality of target optical fiber gratings, and the first optical fiber grating can also be a collection of a plurality of the first optical fiber gratings. As shown in FIG. 6, the input end of the first target optical fiber grating among the four mutually connected target optical fiber gratings (the first preset angle optical fiber grating and the second preset angle optical fiber grating) is connected to the output end of the last first optical fiber grating of two mutually connected first optical fiber gratings, and the input end of the first of two mutually connected first optical fiber gratings is connected to the output end of the pump laser. The amount of the target optical fiber gratings and the amount of the first optical fiber gratings in embodiments of the present application are merely exemplary, and specific amount of the first optical fiber grating and that of the target optical fiber grating in the optical signal outputting device can be identified according to the actual situations, which will not be limited by embodiments of the present application.

Optionally, the preset period optical fiber grating is an optical fiber grating featured by unidirectional optical signal transmission.

In an embodiment of the present application, the preset period optical fiber grating is a coupled optical fiber grating where the fiber core fundamental mode and the cladding mode co-propagate, which means the optical signal transmission direction in the preset period optical fiber grating is from the input end to the output end of the preset period optical fiber grating.

It will be appreciated that by providing the preset angle optical fiber grating or the preset period optical fiber grating behind the first optical fiber grating, the preset angle optical fiber grating or the preset period optical fiber grating screens out the target band optical signal while the second band optical signal is also converted into the target band optical signal by means of the resonance operation of the pump laser, thereby obtaining high quality target band optical signal and improving the quality of light having the target central wavelength outputted by the pump laser.

Embodiment 2

Figure 7:
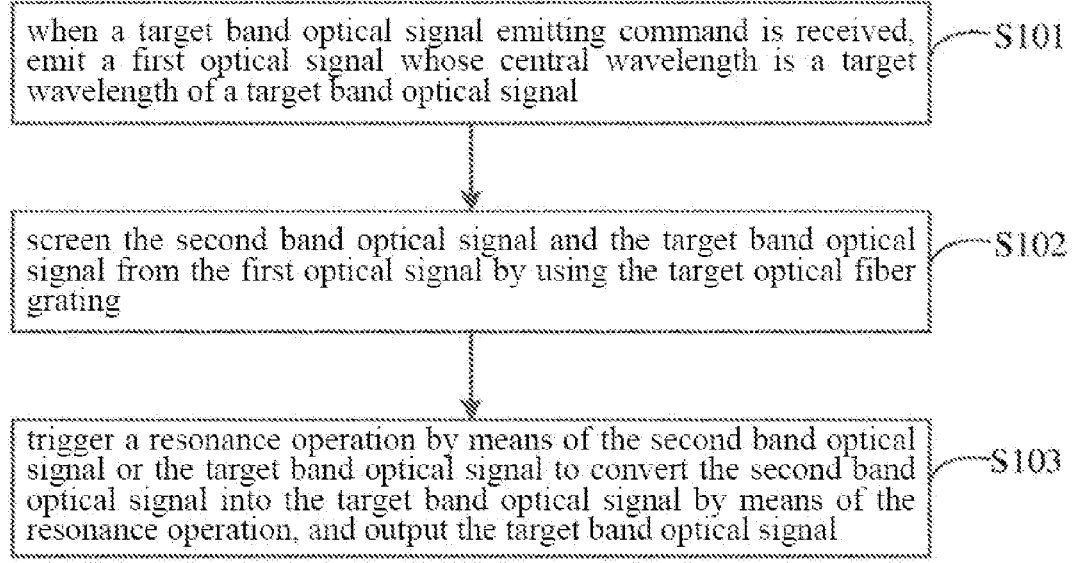
FIG. 7 is a flow diagram I of an output method for optical signals provided by an embodiment of the present disclosure.

An embodiment of the present application provides an optical signal outputting method applied to an optical signal outputting device which comprises a target optical fiber grating. As shown in FIG. 7, the method includes:

S101, emitting a first optical signal when a target band optical signal emitting command is received, wherein a central wavelength of the first optical signal is a target wavelength of a target band optical signal.

In an embodiment of the present application, the optical signal outputting device comprises a target optical fiber grating, a first optical fiber grating connected to the target optical fiber grating, and a pump laser connected to the first optical fiber grating. The target optical fiber grating comprises a preset angle optical fiber grating and a preset period optical fiber grating. The intersection angle between a grating plane and an optical fiber shaft of the preset angle optical fiber grating is a preset angle, and a period length of the preset period length optical fiber grating meets a preset period length.

The optical signal outputting device provided in an embodiment of the present application is suitable for the scenario of obtaining the target band optical signal by processing the generated optical signals.

In an embodiment of the present application, the pump laser is specified with a target central wavelength. When the pump laser is activated, the pump laser receives the target band optical signal emitting command and begins to generate the optical signal with a wavelength being the target central wavelength while generating part of optical signals with a wavelength other than target central wavelength. The optical signal generated by the pump laser is the first optical signal, which will then be emitted by the pump laser.

It should be noted that the first optical signal is an optical signal generated by the pump laser and the central wavelength of the first optical signal is the target wavelength of the target band optical signal.

Exemplarily, the target central wavelength of the pump laser is 974 nm. When the pump laser is activated, the pump laser receives the target band optical signal emitting command and generates the optical signal with a wavelength of 974 nm while generating part of optical signals in a band scope of 960-973 nm and part of optical signals in a band scope of 975-980 nm. That is, the first optical signal is an optical signal in a band scope of 960-980 nm, and the pump laser emits the optical signal in the band scope of 960-980 nm.

S102, screening the second band optical signal and the target band optical signal from the first optical signal by using the target optical fiber grating.

In an embodiment of the present application, the optical signal outputting device further includes a first optical fiber grating. When the pump laser emits the first optical signal, the first optical fiber grating receives the first optical signal, screens the first band optical signal from the first optical signal, and transmits the first band optical signal to the target optical fiber grating. The optical signal outputting device screens the second band optical signal and the target band optical signal from the first band optical signal by using the target optical fiber grating.

It should be noted that the first band optical signal is the optical signal screened out from the first optical signal, the central wavelength of the first band optical signal is the target wavelength of the target band optical signal and the band scope of the first band optical signal is smaller than the band scope of the first optical signal.

It should be noted that the target optical signal can be an optical signal in the target band and outputted by the optical signal outputting device. For example, if the target band set by the optical signal outputting device is 974-975 nm, then the optical signal with a wavelength of 974-975 nm outputted by the optical signal outputting device is the target band optical signal.

It should be noted that the second band optical signal is an optical signal screened out from the first band optical signal and other than the target band optical signal.

S103, triggering a resonance operation by means of the second band optical signal or the target band optical signal, thereby converting the second band optical signal into the target band optical signal by means of the resonance operation, and outputting the target band optical signal.

In an embodiment of the present application, the target optical fiber grating comprises a preset angle optical fiber grating provided with a preset angle, and the step of triggering the resonance operation by means of the second band optical signal or the target band optical signal specifically is:

In an embodiment of the present application, the optical signal outputting device identifies a first preset band optical signal from the second band optical signal by using the preset angle optical fiber grating.

In an embodiment of the present application, the preset angle optical fiber grating is specified with a preset reflectivity. When the preset angle optical fiber grating screens out the second band optical signal and the target band optical signal from the first band optical signal, the preset angle optical fiber grating outputs the target band optical signal and identifies the first preset band optical signal from the second band optical signal according to the preset reflectivity.

In an embodiment of the present application, the optical signal outputting device obtains the target band optical signal by processing the first preset band optical signal by means of the preset angle.

In an embodiment of the present application, the optical signal outputting device triggers the resonance operation by means of the target band optical signal to convert the second band optical signal into the target band optical signal with the resonance operation, and the first preset band optical signal is a part of the second band optical signals.

In an embodiment of the present application, the preset angle optical fiber grating returns the target band optical signal obtained after the conversion back to the pump laser and the pump laser receives an optical signal adjusting command, after which the pump laser starts to resonate and convert the second band optical signal into the target band optical signal with the resonance operation.

In an embodiment of the present application, the target optical fiber grating comprises a preset period optical fiber grating, and the step of triggering the resonance operation by means of the second band optical signal or the target band optical signal specifically is:

In an embodiment of the present application, the second preset band optical signal is identified from the target band optical signal by using the preset period optical fiber grating.

In an embodiment of the present application, the preset period optical fiber grating is specified with a preset period reflectivity. When the preset period optical fiber grating screens out the second band optical signal and the target band optical signal from the first band optical signal, the preset period optical fiber grating identifies the second preset band optical signal from the target optical signal according to the preset period reflectivity.

It should be noted that the second preset band optical signal is a part of the target band optical signal.

In an embodiment of the present application, the resonance operation is triggered with the second preset band optical signal to convert the second band optical signal into the target band optical signal with the resonance operation, and the second preset band optical signal is a part of the target band optical signal.

In an embodiment of the present application, the preset period optical fiber grating returns the second preset band optical signal back to the pump laser, and the pump laser receives an optical signal adjusting command, after which the pump laser starts to resonate and convert the second band optical signal into the target band optical signal with the resonance operation.

In an embodiment of the present application, when an output end of the preset angle optical fiber grating receives the second optical signal, the preset angle optical fiber grating screens out a third optical signal that does not belong to a preset band scope corresponding to the preset angle optical fiber grating from the second optical signal and transmits the third optical signal to an output end of the first optical fiber grating.

In an embodiment of the present application, the second optical signal is an optical signal received by the output end of the preset angle optical fiber grating.

In an embodiment of the present application, the target optical signal that belongs to a preset band scope corresponding to the first optical fiber grating is screened out from the third optical signal.

In an embodiment of the present application, when the output end of the first optical fiber grating receives the third optical signal, the first optical fiber grating screens out the target optical signal that belongs to the preset band scope corresponding to the first optical fiber grating from the third optical signal and reversely transmits the target optical signal to the pump laser.

It should be noted that the third optical signal is an optical signal in the second optical signal that is other than the optical signal belonging to the preset band scope corresponding to the preset angle optical fiber grating.

It will be appreciated that the preset angle optical fiber grating or the preset period optical fiber grating screens out the target band optical signal by providing the preset angle optical fiber grating or the preset period optical fiber grating behind the first optical fiber grating while the second band optical signal is also converted into the target band optical signal with the resonance operation of the pump laser, thereby obtaining the high quality target band optical signal and improving the quality of light having the target central wavelength outputted by the pump laser.

An embodiment of present application provide a storage medium stored with a computer program. The computer readable storage medium is stored with one or more programs that can be executed by one or more processors and that can be applied to the optical signal outputting device. The computer program achieves the output method for optical signals as described in Embodiment 2.

Those skilled in the art will appreciate that embodiments of the present application can be provided as a method, a system or a computer program product. Therefore, the present application can be achieved by embodiments such as a hardware, a software or the combination of a software and a hardware. Moreover, the present application can be achieved by a computer program product which is implemented on the computer available storage medium (including but not limited to a disk memory and an optical memory etc.) containing computer available program codes.

The present application is described with reference to the flowcharts of the method and/or block diagrams of the device (system) and the computer program product in accordance with embodiments of the present application. It should be understood that each flow and/or block in the flowcharts and/or block diagrams as well as the combination of flows and/or blocks in the flowcharts and/or block diagrams can be achieved by computer program instructions. These computer program instructions can be provided to generic computers, dedicated computers, embedded processors or other programmable data processing equipments to generate a machine, enabling instructions executed by the computer or the processor of other programmable data processing equipment to generate a device that is used to achieve functions designed by one or more flows in the flowchart and/or one or more blocks in the block diagram.

These computer program instructions can also be stored in a computer readable memory capable of booting a computer or other programmable data processing equipment to operate in a particular manner to allow the generation of manufactures including an instruction device by instructions stored in this computer readable memory, wherein the instruction device achieves the functions designed by one or more flows in the flowchart and/or one or more blocks in the block diagram.

These computer program instructions can also be loaded on a computer or other programmable data processing equipment such that a series of steps can be executed on a computer or other programmable equipment to achieve the processing results like the computer, enabling instructions executed on a computer or other programmable equipment to provide steps capable of achieving functions designed by one or more flows in the flowchart and/or one or more blocks in the block diagram.

The above mentioned embodiments are merely preferred embodiments of the present disclosure and do not mean to define the protection scope of the present disclosure.

INDUSTRIAL APPLICABILITY

By providing the preset angle optical fiber grating or the preset period optical fiber grating behind the first optical fiber grating, the preset angle optical fiber grating or the preset period optical fiber grating screens out the target band optical signal, and at the same time, the second band optical signal is also converted into the target band optical signal by means of the resonance operation of the pump laser, thereby obtaining the high quality target band optical signal and improving the quality of light having the target central wavelength outputted by the pump laser.

What is claimed is:
1. An optical signal outputting device comprising:
a target optical fiber grating having a preset angle optical fiber grating and/or a preset period optical fiber grating;
a first optical fiber grating connected to the target optical fiber grating; and
a pump laser connected to the first optical fiber grating;
wherein the pump laser is configured to transmit a first optical signal to the first optical fiber grating when a target band optical signal emitting command is received, a central wavelength of the first optical signal being a target wavelength of a target band optical signal; and to convert a second band optical signal into the target band optical signal by using resonance and output the target band optical signal when an optical signal adjusting command is received;
wherein the first optical fiber grating is configured to screen a first band optical signal from the first optical signal and transmit the first band optical signal to the target optical fiber grating, a central wavelength of the first band optical signal being the target wavelength of the target band optical signal and a band scope of the first band optical signal being smaller than a band scope of the first optical signal; and
wherein the target optical fiber grating is configured to screen the second band optical signal and the target band optical signal from the first band optical signal, and return, by the preset angle optical fiber grating and/or the preset period optical fiber grating, a part of the target band optical signal and/or the second preset band optical signal to the pump laser, to transmit the optical signal adjusting command to the pump laser by using the second band optical signal or the target band optical signal.

2. The device according to claim 1, wherein the preset angle optical fiber grating is an optical fiber grating whose preset angle is an intersection angle between a grating plane and an optical fiber shaft; and the preset period optical fiber grating is an optical fiber grating whose period length meets a preset period length.

3. The device according to claim 2, wherein the preset angle optical fiber grating is further configured to identify a first preset band optical signal from the second band optical signal; to process the first preset band optical signal by means of the preset angle, to obtain the target band optical signal; and to return the target band optical signal back to the pump laser so as to trigger the pump laser to generate resonance; and the first preset band optical signal is a part of the second band optical signal.

4. The device according to claim 2, wherein the preset period optical fiber grating is further configured to identify a second preset band optical signal from the target band optical signal; and to return the second preset band optical signal back to the pump laser so as to trigger the pump laser to generate resonance; and wherein the second preset band optical signal is a part of the target band optical signal.

5. The device according to claim 3, wherein the preset angle optical fiber grating is further configured to, when an output end of the preset angle optical fiber grating receives a second optical signal, screen out a third optical signal that does not belong to a preset band scope corresponding to the preset angle optical fiber grating from the second optical signal, and transmit the third optical signal to an output end of the first optical fiber grating; and the first optical fiber grating is further configured to screen out a target optical signal that belongs to a preset band scope corresponding to the first optical fiber grating from the third optical signal.

6. The device according to claim 2, wherein the preset angle optical fiber grating comprises:
at least one of a first preset angle optical fiber grating and a second preset angle optical fiber grating;
a central wavelength of the first preset angle optical fiber grating is smaller than the target central wavelength; and
a central wavelength of the second preset angle optical fiber grating is larger than the target central wavelength.

7. The device according to claim 1, wherein the preset period optical fiber grating is an optical fiber grating featured by unidirectional optical signal transmission.

8. An optical signal outputting method applied to an optical signal outputting device which comprises a target optical fiber grating, the method comprising:
emitting, by a pump laser, a first optical signal whose central wavelength is a target wavelength of a target band optical signal when a target band optical signal emitting command is received;
screening a second band optical signal and the target band optical signal from the first optical signal and return a part of the target band optical signal and/or the second preset band optical signal to the pump laser by using the target optical fiber grating; and
triggering a resonance operation by using the second band optical signal or the target band optical signal to convert the second band optical signal into the target band optical signal by using the resonance operation, and outputting the target band optical signal.

9. The method according to claim 8, wherein the step of screening the second band optical signal and the target band optical signal from the first optical signal by using the target optical fiber grating comprises:
screening, from the first optical signal, a first band optical signal whose central wavelength is the target wavelength of the target band optical signal and whose band scope is smaller than a band scope of the first optical signal; and
screening the second band optical signal and the target band optical signal from the first band optical signal by using the target optical fiber grating.

10. The method according to claim 8, wherein the target optical fiber grating comprises a preset angle optical fiber grating provided with a preset angle, and the step of triggering the resonance operation by using the second band optical signal or the target band optical signal comprises:
identifying a first preset band optical signal from the second band optical signal by using the preset angle optical fiber grating;
processing the first preset band optical signal by means of the preset angle and obtaining the target band optical signal; and
triggering the resonance operation by using the target band optical signal to convert the second band optical signal into the target band optical signal by means of the resonance operation; the first preset band optical signal being a part of the second band optical signal.

11. The method according to claim 8, wherein the target optical fiber grating comprises a preset period optical fiber grating, and the step of triggering the resonance operation by using the second band optical signal or the target band optical signal comprises:
identifying a second preset band optical signal from the target band optical signal by using the preset period optical fiber grating; and
triggering a resonance operation by using the second preset band optical signal to convert the second band optical signal into the target band optical signal by using the resonance operation; the second preset band optical signal being a part of the target band optical signal.

12. The method according to claim 10, wherein the optical signal outputting device further comprises a first optical fiber grating, and after triggering the resonance operation by using the target band optical signal, the method further comprises:
screening out a third optical signal that does not belong to a preset band scope corresponding to the preset angle optical fiber grating from a second optical signal and transmitting the third optical signal to an output end of the first optical fiber grating when an output end of the preset angle optical fiber grating receives the second optical signal; and
screening out a target optical signal that belongs to a preset band scope corresponding to the first optical fiber grating from the third optical signal.

13. A non-transitory storage medium, upon which is stored with a computer program applied to an optical signal outputting device, wherein the computer program is executed by a processor to implement an optical signal outputting method applied to an optical signal outputting device which comprises a target optical fiber grating, the method comprising:
emitting, by a pump laser, a first optical signal whose central wavelength is a target wavelength of a target band optical signal when a target band optical signal emitting command is received;
screening a second band optical signal and the target band optical signal from the first optical signal and return a part of the target band optical signal and/or the second preset band optical signal to the pump laser by using the target optical fiber grating; and triggering a resonance operation by using the second band optical signal or the target band optical signal to convert the second band optical signal into the target band optical signal by using the resonance operation, and outputting the target band optical signal.

14. The device according to claim 3, wherein the preset period optical fiber grating is an optical fiber grating featured by unidirectional optical signal transmission.

15. The non-transitory storage medium according to claim 13, wherein the step of screening the second band optical signal and the target band optical signal from the first optical signal by using the target optical fiber grating comprises:
   screening, from the first optical signal, a first band optical signal whose central wavelength is the target wavelength of the target band optical signal and whose band scope is smaller than a band scope of the first optical signal; and
   screening the second band optical signal and the target band optical signal from the first band optical signal by using the target optical fiber grating.

16. The non-transitory storage medium according to claim 13, wherein the target optical fiber grating comprises a preset angle optical fiber grating provided with a preset angle, and the step of triggering the resonance operation by using the second band optical signal or the target band optical signal comprises:
   identifying a first preset band optical signal from the second band optical signal by using the preset angle optical fiber grating;
   processing the first preset band optical signal by means of the preset angle and obtaining the target band optical signal; and
   triggering the resonance operation by using the target band optical signal to convert the second band optical signal into the target band optical signal by means of the resonance operation; the first preset band optical signal being a part of the second band optical signal.

17. The non-transitory storage medium according to claim 13, wherein the target optical fiber grating comprises a preset period optical fiber grating, and the step of triggering the resonance operation by using the second band optical signal or the target band optical signal comprises:
   identifying a second preset band optical signal from the target band optical signal by using the preset period optical fiber grating; and
   triggering a resonance operation by using the second preset band optical signal to convert the second band optical signal into the target band optical signal by using the resonance operation; the second preset band optical signal being a part of the target band optical signal.

18. The non-transitory storage medium according to claim 16, wherein the optical signal outputting device further comprises a first optical fiber grating, and after triggering the resonance operation by using the target band optical signal, the method further comprises:
   screening out a third optical signal that does not belong to a preset band scope corresponding to the preset angle optical fiber grating from a second optical signal and transmitting the third optical signal to an output end of the first optical fiber grating when an output end of the preset angle optical fiber grating receives the second optical signal; and
   screening out a target optical signal that belongs to a preset band scope corresponding to the first optical fiber grating from the third optical signal.

* * * * *